US008128892B2

(12) United States Patent
Butz et al.

(10) Patent No.: US 8,128,892 B2
(45) Date of Patent: Mar. 6, 2012

(54) PROGRAMMABLE MULTI-CHANNEL PIPETTOR WITH REPOSITIONABLE TIPS

(75) Inventors: David E. Butz, Groton, MA (US); Gregory Mathus, Concord, MA (US); Richard Cote, Bolton, MA (US); George P. Kalmakis, Gloucester, MA (US)

(73) Assignee: Integra Biosciences Corp., Hudson, NH (US)

( * ) Notice: Subject to any disclaimer, the term of this patent is extended or adjusted under 35 U.S.C. 154(b) by 0 days.

(21) Appl. No.: 13/219,823

(22) Filed: Aug. 29, 2011

(65) Prior Publication Data

US 2011/0311410 A1 Dec. 22, 2011

Related U.S. Application Data

(62) Division of application No. 12/115,005, filed on May 5, 2008, now Pat. No. 8,029,742.

(51) Int. Cl.
*B01L 3/00* (2006.01)
*B01L 3/02* (2006.01)
*G01N 1/14* (2006.01)

(52) U.S. Cl. ..................... 422/501; 422/521; 73/864.01; 73/864.17

(58) Field of Classification Search .................. 422/501, 422/527; 73/864.01, 864.17
See application file for complete search history.

(56) References Cited

U.S. PATENT DOCUMENTS 662,087 A 11/1900 Nichols et al.
4,226,136 A 10/1980 Porter et al.
(Continued)

FOREIGN PATENT DOCUMENTS

EP 1739434 1/2007
(Continued)

*Primary Examiner* — Jill Warden
*Assistant Examiner* — Charles D Hammond
(74) *Attorney, Agent, or Firm* — Andrus, Sceales, Starke & Sawall, LLP

(57) ABSTRACT

A hand-held, multi-channel pipettor has an electronically controlled motor to reposition pipette tips for different center to center spacing. Each repositionable tip fitting assembly has a cam following pin that is driven by cam tracks in a motor driven roller drum. Stationary ports for the multiple aspiration cylinders are strategically placed to simplify management of flexible tubes leading to the repositionable pipette tip fitting assemblies. The pipettor has a user interface that can be operated conveniently by one hand to reposition pipette tips. It has a pipette tip ejection mechanism with a sinusoidal stripper bar.

12 Claims, 14 Drawing Sheets

U.S. PATENT DOCUMENTS

| | | | |
|---|---|---|---|
| 4,830,832 | A | 5/1989 | Arpagaus et al. |
| 5,057,281 | A | 10/1991 | Torti et al. |
| 5,061,449 | A | 10/1991 | Torti et al. |
| 6,235,244 | B1 | 5/2001 | Allen et al. |
| 6,415,669 | B1 | 7/2002 | Carl |
| 2001/0036425 | A1 | 11/2001 | Gazeau et al. |
| 2002/0020233 | A1 | 2/2002 | Baba et al. |
| 2004/0099067 | A1 | 5/2004 | Chen et al. |
| 2007/0003445 | A1 | 1/2007 | Belgardt et al. |
| 2009/0104079 | A1 | 4/2009 | O'Connell et al. |

FOREIGN PATENT DOCUMENTS

| | | |
|---|---|---|
| FR | 2739935 | 9/2009 |

FIG. 8A
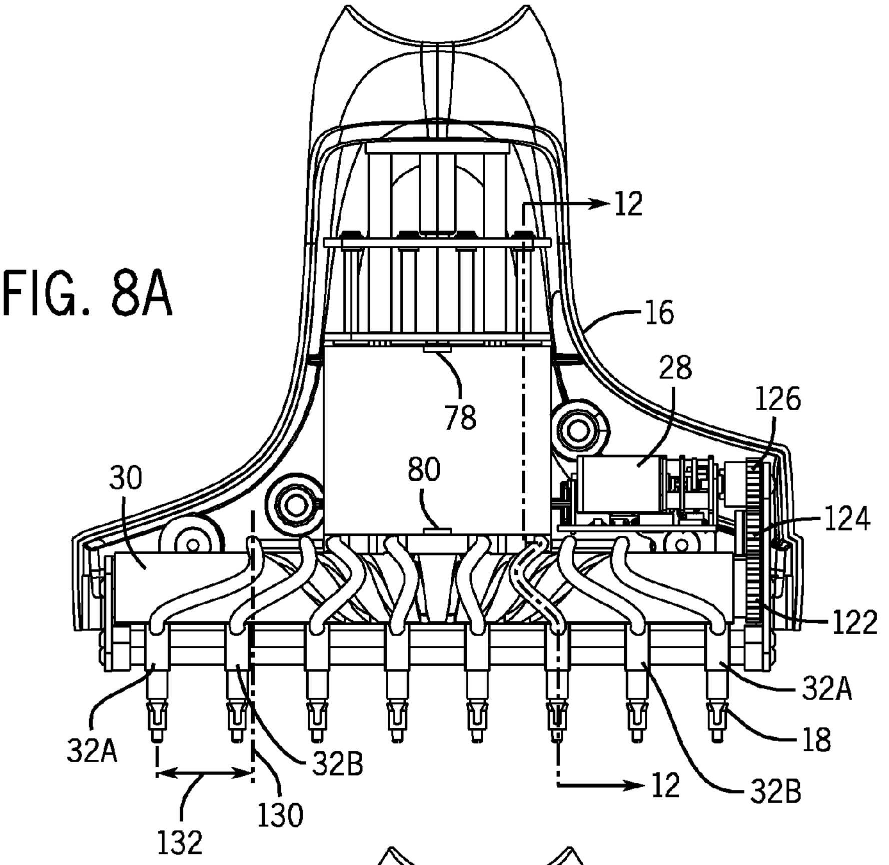
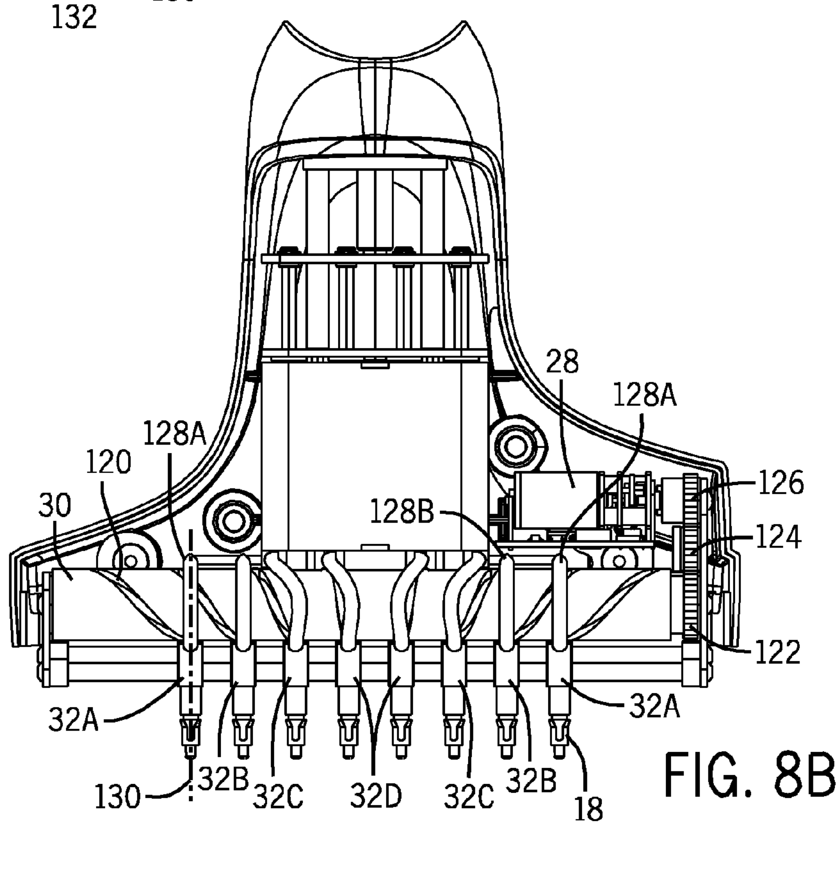
FIG. 8B

FIG. 8C
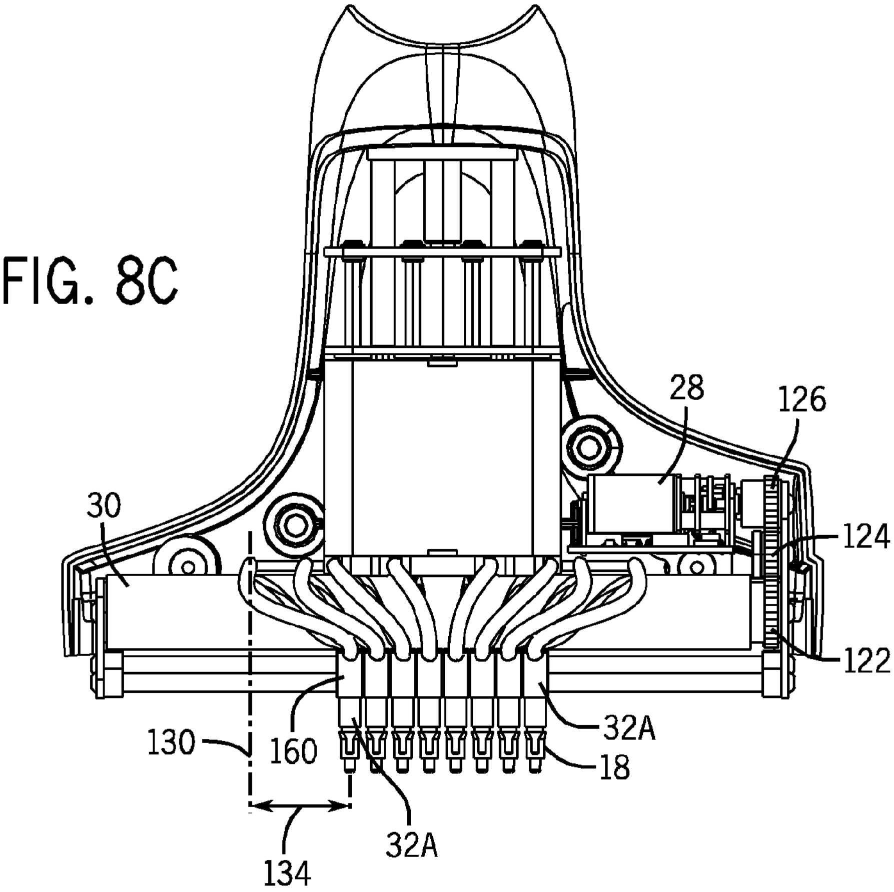
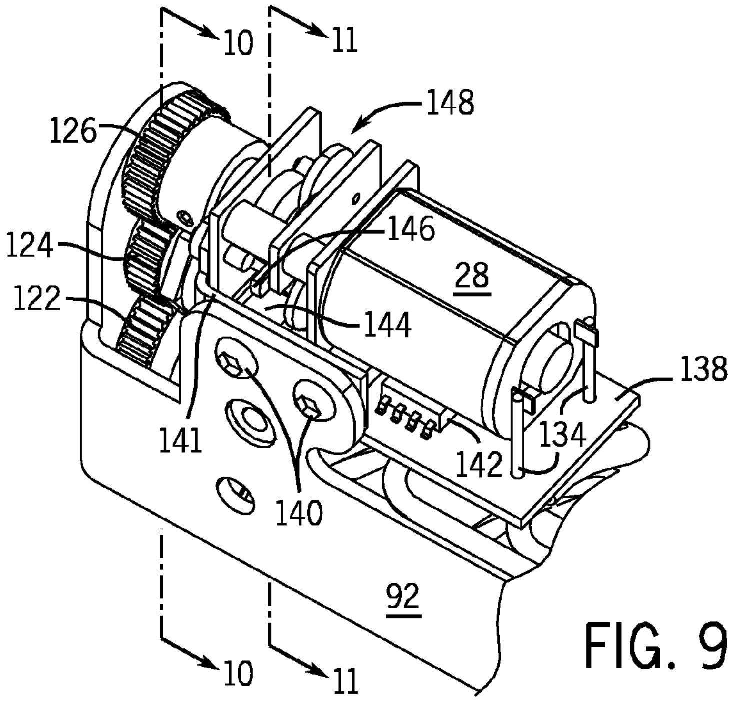
FIG. 9

PROGRAMMABLE MULTI-CHANNEL PIPETTOR WITH REPOSITIONABLE TIPS

CROSS REFERENCE TO RELATED APPLICATION

This application is a division of U.S. patent application Ser. No. 12/115,005, filed May 5, 2008.

FIELD OF THE INVENTION

The invention relates to hand-held, multi-channel electronic pipettors, and in particular, those having repositionable tip fittings or mounting shafts for disposable pipette tips.

BACKGROUND OF THE INVENTION

Hand-held, multi-channel pipettors are designed to enable laboratory workers to transfer multiple samples or reagents from one series of containers to another series of containers, such as from one row of wells in a microtiter plate to another row of wells in another microtiter plate. While some multi-channel pipettors rely on manually powered piston movement for aspirating and dispensing, many use electronically controlled stepper motors to control piston movement for aspirating and dispensing. It is quite common in laboratories to have microtiter plates or well plates with 24, 96, 384, or 1536 wells in an array of rows and columns. Typically, but not always, the center line spacing between wells is 9 mm or some fraction or multiple thereof. Center-to-center spacing between pipette tip mounting shafts is therefore often fixed in multi-channel pipettors, for example, 9 mm or 4.5 mm spacing.

On the other hand, some multi-channel electronic pipettors allow the user to manually adjust the center-to-center spacing between the tip fittings. This feature allows lab workers to transfer multiple samples of liquids from a series of containers having one center line spacing to another series of containers having different center line spacing. In other words, some hand-held pipettors on the market allow the user to reposition the pipette tips so that a sample or reagent can be aspirated into multiple pipette tips from a series of wells, tube or other containers having a first center-to-center spacing (e.g. 4.5 mm) and then dispensed into another series of wells, tubes or other containers having a different spacing (e.g. 9 mm). For example, U.S. Pat. No. 6,235,244 discloses a multi-channel pipettor where the center line spacing between the tip fittings is controlled manually by a scissors mechanism actuated by pulling a rod on the exterior of the pipettor. The mounting shafts or fittings for the pipette tips are attached to the scissors mechanism which expands or contracts as needed to reposition the pipette tips. The individual fittings slide along a path defined by a slotted track in the housing for the lower multi-channel assembly. In this design, the complexity of the scissors mechanism, as well as its off-center drive point, can produce inaccuracies in the center-to-center spacing for the individual tip fittings. These units also require two hand operation; one hand for holding the unit and the other to operate the change-in-spacing mechanism.

In contrast to hand-held pipettors, automated, stationary pipetting systems have in the past used roller drums with cam tracks to adjust the center-to-center spacing between pipette tip mounting shafts, again in order to facilitate aspiration from a first series of containers or wells and dispensing into a second series having a different center line spacing. Such a system is disclosed in U.S. Pat. No. 4,830,832. Of course, design constraints for stationary lab equipment as to size and scale are not critical, as compared to hand-held pipettors. With hand-held pipettors, it is important that the design be compact, and that weight be kept to a minimum. It is also particularly important that the width of the lower multi-channel assembly from front to back be kept slender in order to allow the user to easily view the mounted pipette tips. Further, it is important to keep the overall height of the pipettor at a minimum in order to optimize ergonomics and control. In addition, it is important that hand-held, electronic pipettors, not only provide accurate pipetting functions as well as accurate tip spacing, but also provide a smooth operating mechanism that draws minimal power, allow one handed operation and employ an intuitive control system.

SUMMARY OF THE INVENTION

As mentioned, the invention pertains to improvements in hand-held, multi-channel electronic pipettors having repositionable tip fitting assemblies. In the preferred embodiment, the pipettor includes a handle assembly that is adapted to be held in the palm of a user's hand, and a lower multi-channel assembly having a cylinder block with multiple aspiration cylinders, a multi-piston assembly, and a plurality of repositionable tip fitting assemblies. Each repositionable tip fitting assembly has a downwardly extending pipette tip mounting shaft. In one aspect, the invention relates to the use of a motor dedicated to controlling the movement and repositioning of the tip fitting assemblies to adjust the center to center spacing between the pipette tip mounting shafts. The motor is preferably controlled by user programmed and operated software, loaded into the pipettor, that is a modified version of software normally in place to operate a stepper motor to drive the pistons to aspirate and dispense, but modified to further control the additional motor to reposition the center to center spacing of the pipette tips. The software preferably allows the user to set two or three position settings which can be easily navigated on a repeatable basis in a reliable and convenient manner by hitting buttons on the pipettor user interface. In the preferred embodiment, the stepper motor for controlling the movement of the pistons in order to aspirate and dispense is located in the upper handle assembly, as is known in the art. The second motor for moving the piston mounting shafts to adjust the center to center spacing is preferably located in the lower multi-channel assembly The preferred lower multi-channel assembly has a chassis to which the motor is mounted, and includes vertically stacked gears to transmit power vertically downward from the motor output shaft to a roller drum. The vertically stacked gears as well as locating the motor above the roller drum allow the lower multi-channel assembly to maintain a slender profile. The roller drum is preferably made of a lubricious material and is machined with cam tracks in its outer surface. The bodies of the repositionable tip fitting assemblies are slidably mounted on at least one but preferably two guide rods residing below and parallel to the roller drum. The repositionable tip fitting assemblies include a port to receive flexible tubing from the cylinder block, a downwardly extending pipette tip mounting shaft, and an upwardly extending cam following pin. When the pipettor is assembled, the cam following pin resides in an associated cam track on the roller drum. The pitch of each cam track is selected so that the center to center distance between adjacent pipette tip mounting shafts changes evenly as the roller drum is rotated. Preferably, the total path wrap for each cam track is less than one full revolution of the roller drum. Operation of the motor in the lower multi-channel assembly adjusts the center-to-center spacing between the pipette tip mounting shafts by rotating the vertically stacked gears which in turn rotates the roller drum, and the cam tracks translate that rotational motion into linear motion of the repositionable tip fitting assemblies from which the pipette tip mounting shafts depend. The preferred motor is a miniature DC gear motor, which uses cluster gears in order to reduce rotational output speed through the vertically stacked gears and roller drum. In one embodiment, a reflective photo detector is used to count revolutions of a flag rotating in sync with one of the cluster gears in order to provide feedback as to the positioning of the roller drum and hence the repositionable tip fitting assemblies. Alternatively, and perhaps preferably, the photo detector may be used to count passing gear teeth directly.

While the use of a roller drum with cam tracks is the preferred means for moving the repositionable tip fitting assemblies, many aspects of this invention can be implemented without the use of a roller drum. For example, the repositionable tip fitting assemblies can be moved using a mechanical scissors mechanism as is known in the art, other types of mechanical cam mechanism such as a cam plate, mechanical screws, or even by the use of repelling magnets.

Another aspect of the invention relates to the management of flexible tubing between stationary output ports for the aspiration cylinders and the input ports to the repositionable tip fitting assemblies. It has been found desirable to use rigid tubing from output ports of a cylinder block to fix a location where it is then desirable to attach the flexible tubing that leads to the respective repositionable tip fitting assembly. In order to provide a slender design for the lower assembly, it is desirable that the outlet of the rigid tubing be set back from the front surface of the cylinder block, or more to the point, set back from of the front surface of the drum. Also, the amount of flexible tubing can be reduced, thereby simplifying tube management and reducing space requirement, if the outlet for the rigid tubes for the outermost channels is located at or near the center of the range of motion for the outermost repositionable tip fitting assemblies. It has therefore been found desirable to run the rigid tubes for the outermost repositionable fittings rearward as the rigid tubes exit the cylinder block and then bend the tubes outward beyond the periphery of the cylinder block. In addition, it is desired that the port on the repositionable tip fitting assemblies point upward angularly, preferably at about 40° or tangent to the roller drum in order to reduce the amount of space in front of the cylinder block required for the flexible tubing.

In another aspect of the invention, the multi-channel pipettor provides an improved ejection mechanism that includes several features to facilitate effective and ergonomic tip ejection. The preferred ejector mechanism includes an ejector push bar having an accelerator portion and a decelerator portion as well as a rocker arm, in manner similar, although modified, to that disclosed in copending patent application entitled "Pipette Tip Ejection Mechanism", application Ser. No. 11/856,193, by Gregory Mathus and Richard Cote, filed Sep. 17, 2007, which is assigned to the assignee of the present application and also incorporated herein by reference. During the beginning of the stroke of the ejector button, the decelerator portion of the ejector push bar engages the rocker arm which in turn engages an ejection mechanism in the lower multi-cylinder assembly. The leverage of the rocker arm provides mechanical advantage to enhance the ejection force during the beginning of the stroke of the ejector button. Towards the bottom of the stroke of the ejector button, the accelerator portion of the push bar engages the ejection mechanism in the lower multi-channel assembly, thereby providing sufficient stroke to ensure ejection of all of the pipette tips. The ejection mechanism for the lower assembly includes, among other features, a lower stripper bar with a continuously varied stripping height, preferably a sinusoidal varying stripping height with a maximum height at the center and at the outermost position for the pipette tips. In this manner, the multiple pipette tips are ejected in pairs and each pair is ejected at a slightly different moment from the other pairs, thereby reducing the maximum ejection force required.

Other features and advantages of the pipettor should be apparent to those skilled in the art upon reviewing the following drawings and description thereof.

BRIEF DESCRIPTION OF THE DRAWINGS

FIGS. 8A-8C are front elevational views of the lower portion of the pipettor shown in FIGS. 1-7 which schematically illustrate the pipette tip fitting assemblies being fully open, FIG. 8A, in an intermediate position, FIG. 8B, and in a closed position, FIG. 8C.

FIG. 9 is a detailed view of a motor and gears for moving the pipette tip fitting assemblies to adjust the center line spacing between the mounting shafts between aspiration and dispense cycles.

DETAILED DESCRIPTION OF THE PREFERRED EMBODIMENT OF THE INVENTION

Figure 1:
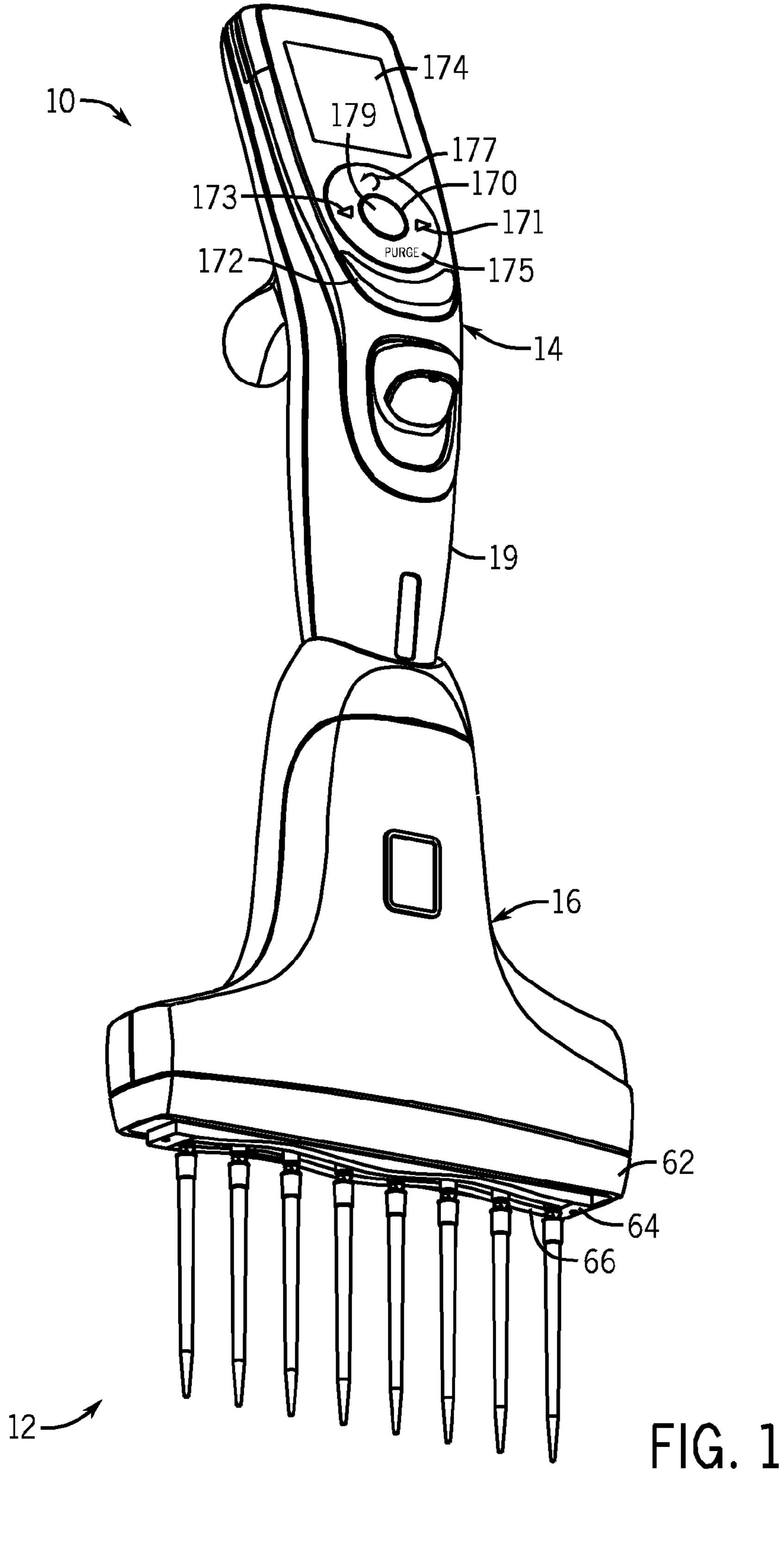
FIG. 1 is a perspective view of a hand-held, electronic multi-channel pipettor having repositionable pipette tips and constructed in accordance with a preferred embodiment of the invention.

FIG. 1 illustrates a hand-held, electronic multi-channel pipettor 10 having repositionable pipette tips 12, and constructed in accordance with the preferred embodiment of the invention. The pipettor shown in FIG. 1, as well as the other Figures, illustrates an 8-channel pipettor, however, the invention is not limited to pipettors having eight channels. For example, pipettors having twelve channels, or some other number of channels, are common and are contemplated as being within the scope of the invention.

The multi-channel pipettor 10 includes an upper handle assembly 14 and a lower multi-channel assembly 16. The pipette tips 12 are mounted to pipette tip fittings or mounting shafts 18, hidden in FIG. 1 but shown clearly in FIG. 6 as well as in other figures. The pipette tips 12, when mounted, generally lie in a vertical plane when the pipettor 10 is held vertically, but are repositionable within the vertical plane in order to change the center-to-center spacing between the tips 12. The upper handle assembly 14 includes a housing 19 that is designed to be held in the palm of the user's hand. Internal components contained within the upper handle assembly 14, as discussed below, include an electronically controlled stepper motor 20 (see, FIG. 2) that drives an output shaft up and down in order to aspirate and dispense. The lower multi-channel assembly 16 includes a main piston drive shaft 22 (see, FIG. 7) which is connected to and driven by the output shaft for the stepper motor 20. The main piston drive shaft 22 consequently drives a piston drive plate 26 and a plurality of pistons 24 (see, FIG. 7) extending downward from the piston drive plate 26 in order to aspirate and dispense through the multiple, repositionable pipette tips 12.

In the preferred embodiment, the multi-channel pipettor 10 includes many features discussed in copending patent applications that are assigned to the assignee of the present application and incorporated herein by reference. With respect to the internal components of the upper handle assembly 14, its operation in the preferred embodiment is described generally in copending patent application entitled "Electronic Pipettor Assembly", application Ser. No. 11/856,231, by Gary E. Nelson, George P. Kalmakis, R. Laurence Keene, Joel Novak, Kenneth Steiner, Jonathan Finger, Gregory Mathus and Richard Cote, filed on Sep. 17, 2007, assigned to the assignee of the present application and incorporated herein by reference, and copending application entitled "Pipettor Software Interface", application Ser. No. 11/856,232, by George Kalmakis, Gary Nelson, Gregory Mathus, Terrence Kelly, Joel Novak, Kenneth Steiner, and Jonathan Finger, filed Sep. 17, 2007, assigned to the assignee of the present application and incorporated herein by reference. The preferred configurations for the pipette tips and the pipette tip mounting shafts are disclosed in copending patent applications entitled "Locking Pipette Tip and Mounting Shaft", application Ser. No. 11/552,384, by Gregory Mathus, Terrence Kelly and Richard Cote, filed on Oct. 24, 2006, assigned to the assignee of the present application and incorporated herein by reference, and continuation-in-part application Ser. No. 11/934,381 entitled "Locking Pipette Tip and Mounting Shaft", by Gregory Mathus, Terrence Kelly and Richard Cote, filed on Nov. 2, 2007, which is also assigned to the assignee of the present application and incorporated herein by reference. Many aspects of the preferred ejection mechanism for the multi-channel pipettor 10 are disclosed in copending patent application entitled "Pipette Tip Ejection Mechanism", application Ser. No. 11/856,193, by Gregory Mathus and Richard Cote, filed Sep. 17, 2007, which is assigned to the assignee of the present application and also incorporated herein by reference. Differences in the ejection mechanism for the preferred embodiment herein are now discussed.

Figure 2:
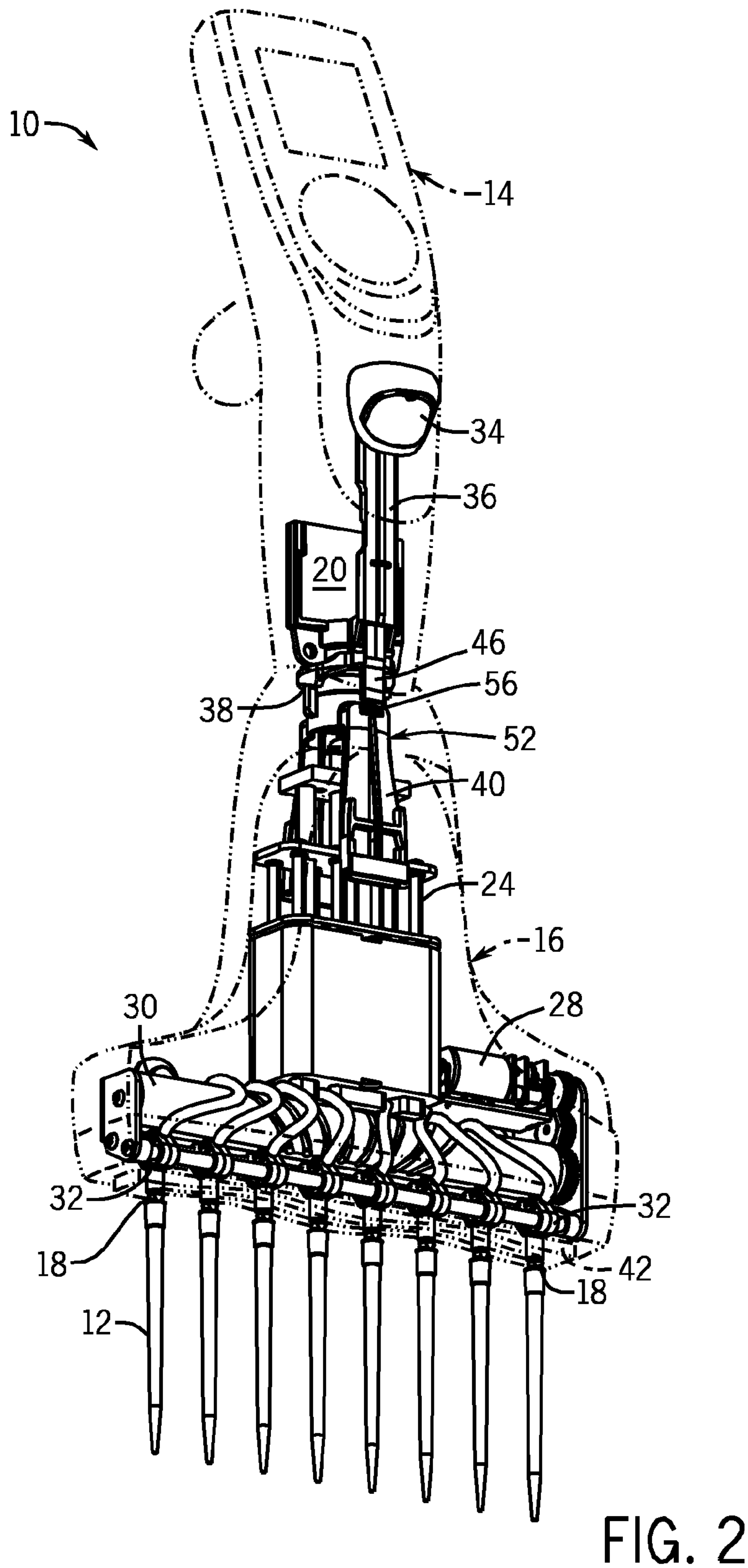
FIG. 2 is a view of the pipettor shown in FIG. 1 with the upper and lower housing removed (shown in phantom) in order to illustrate various internal components of the pipettor.

Referring now to FIG. 2, the housings for the upper handle assembly 14 and the lower multi-channel assembly 16 have been removed to display certain internal components of the pipettor 10. As mentioned, the upper handle assembly has an electronically controlled stepper motor 20 for driving an output shaft that moves up and down to control the movement of the pistons 24 in the lower multi-channel assembly 16. The pipettor 10 also includes a second motor 28, preferably a miniature DC gear motor, which drives a tracked roller drum 30 to slide repositionable tip fitting assemblies 32 in order to adjust the center line spacing between the tip fittings 18. FIG. 2 also shows certain components of the ejection mechanism, including an ejector button 34, an ejector push bar 36, and a rocker arm 38 located generally in the upper handle assembly 14, as well as a forked ejection collar 52 in the lower multi-channel assembly 16 which is connected to a lower stripper assembly 42 that ejects the pipette tips 12 from the tip fitting mounting shafts 18, as described in FIGS. 3, 4 and 5A-5B.

Figure 3:
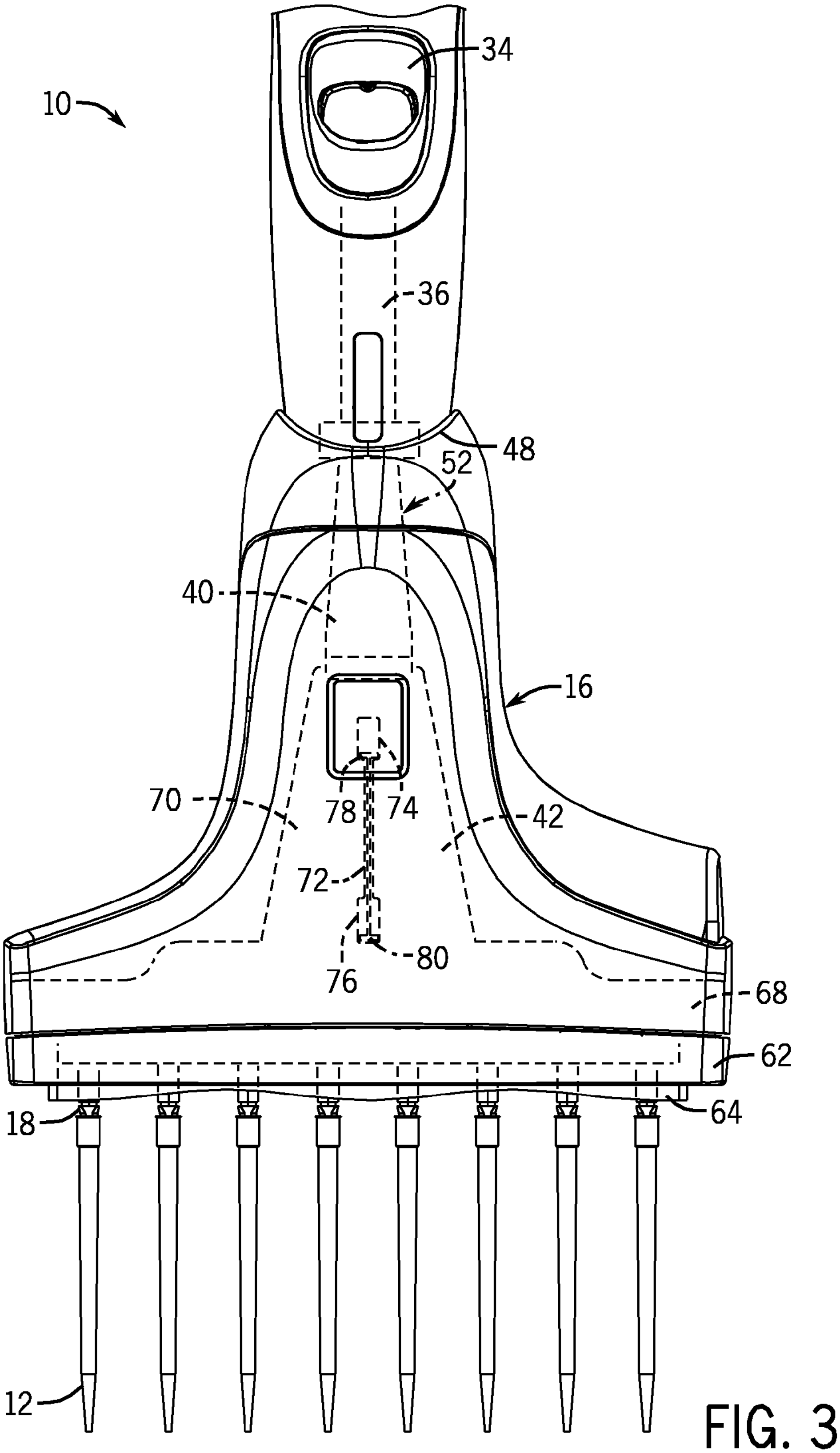
FIG. 3 is a front plan view of lower sections of the pipettor shown in FIGS. 1 and 2.
Figure 4:
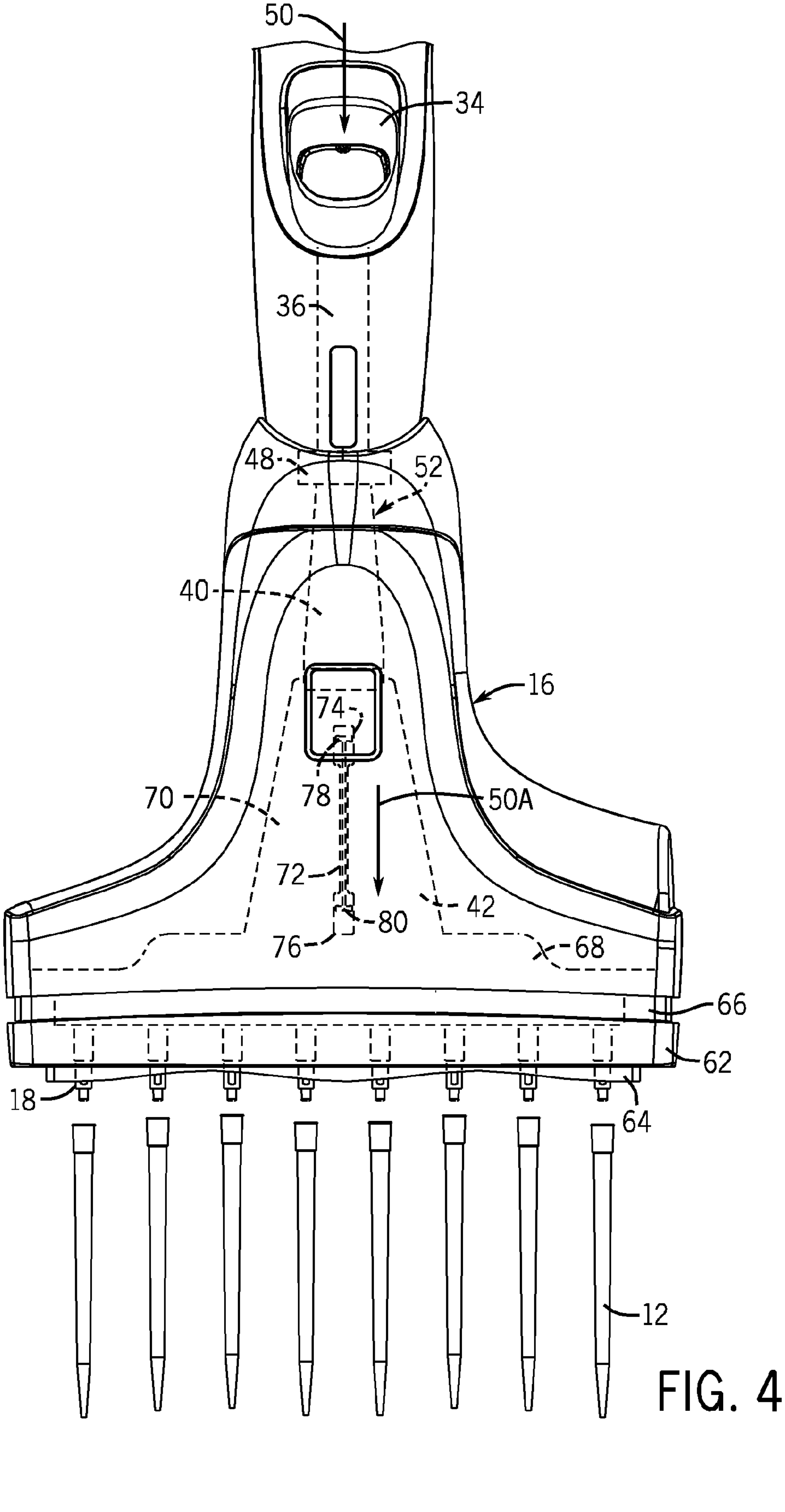
FIG. 4 is a view similar to FIG. 3 schematically illustrating the ejection of multiple pipette tips from the pipettor.
Figure 5A:
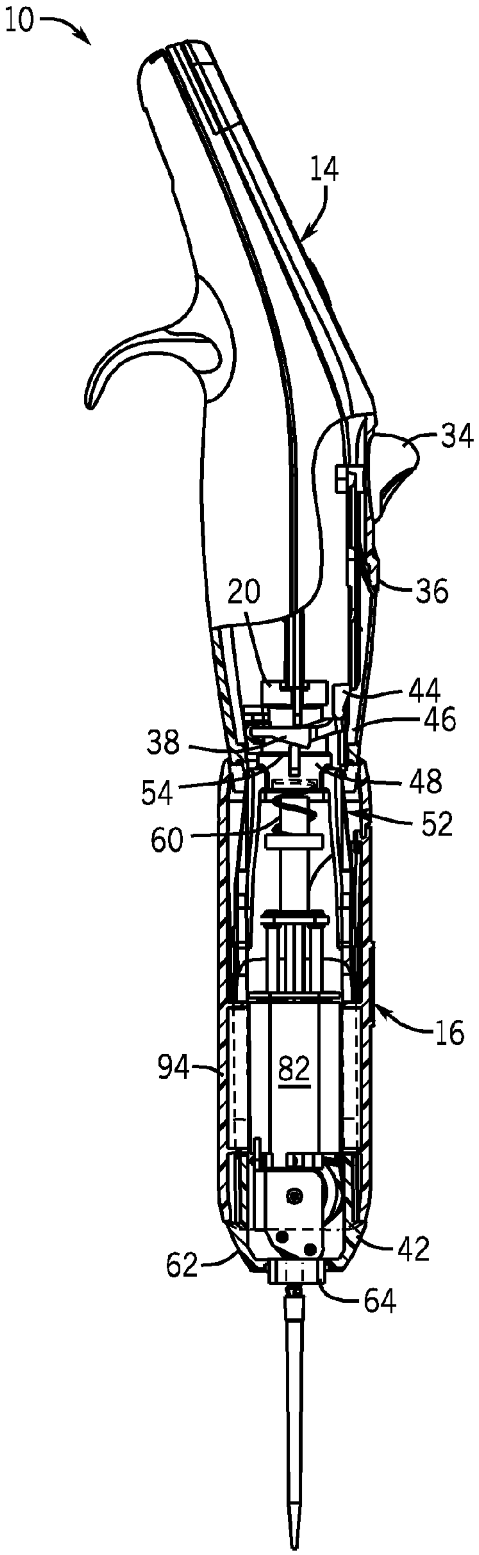
FIG. 5A is a side elevational view of the pipettor illustrated in FIGS. 1-4 with lower portions of the housing broken away in order to illustrate internal components of the pipettor.
Figure 5B:
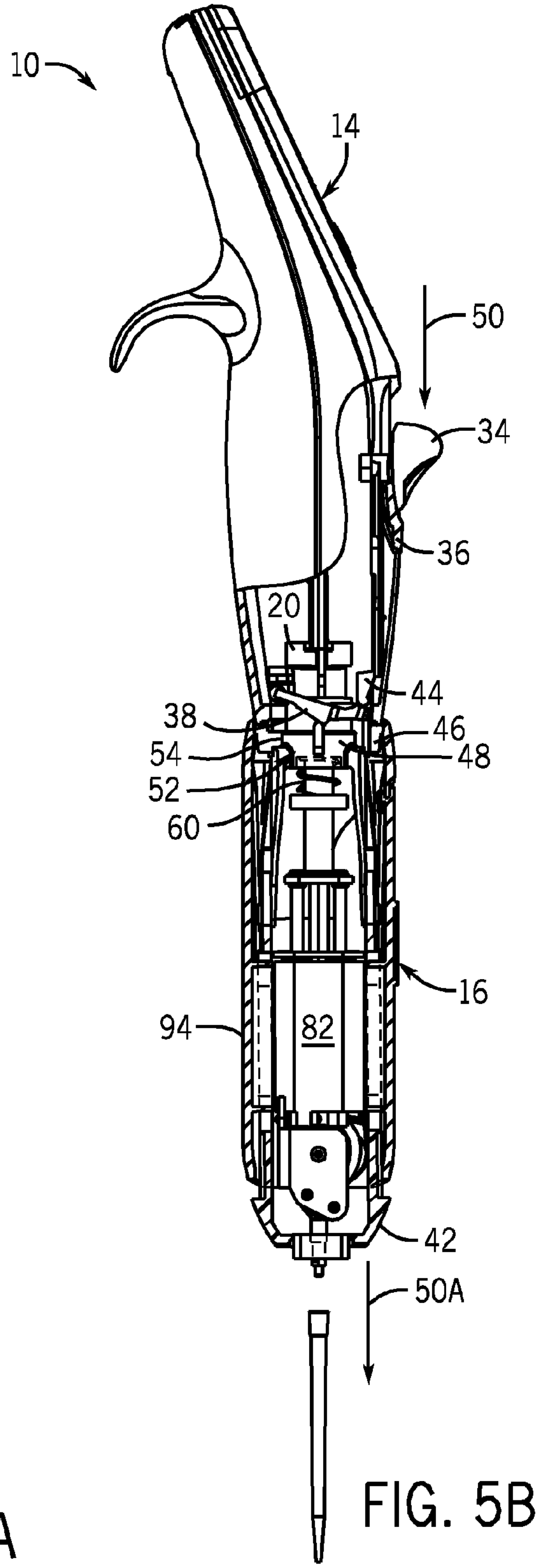
FIG. 5B is a view similar to the view shown in FIG. 5A but also schematically illustrating the ejection of pipette tips from the pipettor.

Referring now to FIGS. 3, 4 and 5A-5B, as mentioned, the preferred ejection mechanism uses an ejector push bar 36 and a rocker arm 38 having a configuration similar to the preferred configuration disclosed in copending and incorporated U.S. patent application Ser. No. 11/856,193, entitled "Pipette Tip Ejection Mechanism." Although the preferred configuration is slightly modified, as will be discussed below, the ejector push bar 36 includes a decelerator portion 44 and an accelerator portion 46, see FIGS. 5A-5B. The rocker arm 38 is pivotally mounted to the internal frame in the upper handle assembly 14, and has a downward facing surface that engages a collar 48 in the lower multi-channel assembly 16. When the user presses the ejector button 34 in the direction of arrow 50, FIG. 5B, the ejector push bar 36 moves downward, and during the beginning of the downward stroke, the decelerator portion 44 engages the rocker arm 38 which in turn engages the collar 48 to provide downward movement to the ejection mechanism in the lower multi-channel assembly 16. Preferably, the collar 48 in the lower assembly 16 is part of an integral forked ejection collar member 52. The forked ejection collar has downwardly extending tabs 40 which are connected on either side of the lower multi-channel assembly 16 to the lower stripper assembly. The collar 48 includes two upwardly extending pedestals 54 which as shown in FIGS. 5A and 5B are the locations where the rocker arm 38 engages the collar 48. At some point, the accelerator portion 46 on the ejector push bar 36 directly engages a seat 56, FIG. 2 on the forked ejection collar 52. The seat 56 is located at a height below the height of the pedestal 54, which helps to reduce the overall height of the pipettor 10. A spring 60 biases the forked ejection collar 52, as well as the entire ejection mechanism upward. As described in the above incorporated copending patent application Ser. No. 11/856,193, the transmitted ejection force to the lower multi-channel assembly 16 is increased above the amount of force applied to the ejector button 34 via mechanical advantage due to the leverage of the rocker arm 38 over the first portion of the stroke of the ejector button 34. Over the lower portion of the stroke of the ejector button 34, the accelerator portion 46 directly engages the seat 56 in the forked ejection collar assembly 52 and the transmitted ejection force is not increased via mechanical advantage, but the stroke for the ejection assembly in the lower multi-channel assembly 16 is not further reduced, thereby ensuring reliable tip ejection.

The lower stripper assembly 42 is preferably an integrally molded plastic component having a base 62 having a longitudinal slot 66, FIG. 1, through which the pipette tip mounting shafts 18 extend. The base 62 also includes a stripper bar 64 that surrounds the longitudinal slot 66, FIG. 1. The slot is preferably slightly longer than 99 mm, in order to accommodate a preferred maximum span of 99 mm between pipette tips. The stripper bar 64 is preferably machined from, for example, aluminum and attached to the base 62. The lower surface of the stripper bar 64 is preferably sinusoidal in shape with a peak being located along the center of the longitudinal slot 66 and other peaks being located at the ends of the longitudinal slot 66. The preferred difference in height between the peaks and valleys of the sinusoidal ejection surface is 2 mm. The sinusoidal ejection surface distributes the required ejection forces in time as the pipette tips 12 are being ejected, as illustrated in FIG. 4. FIG. 4 shows the pipette tips 12 fully spread, but it should be appreciated that the sinusoidal stripper bar 64 will distribute the required ejection forces in time among the tips 12 even if the tip mounting shafts 18 are fully tightened or are in an intermediate position.

Above the base 62, the lower stripper assembly 42 includes a lower sleeve portion 68 and upper extension panels 70. The lower sleeve portion 68 and extension panels 70 are contained within the housing for the lower assembly 16, whereas the base 62 is exposed externally. Although not clearly shown in the Figures, the downwardly extending tabs 40 on the forked ejection collar 52 preferably include a snap fitting which engages a corresponding snap fitting on one of the extension panels 70. In this manner, the forked ejection collar assembly 52 and the lower stripper assembly 42 (which includes integrally molded extension panels 70, lower sleeve portion 68, and base 62, as well as the machined stripper bar 64) move up and down as a unitary member.

On each side of the pipettor 10, the extension panel 70 contains a vertical guide slot. Preferably, the slot 72 has an upper widened groove portion 74 and a lower widened groove portion 76. These widened groove portions 74, 76 are designed to receive tabs 78, 80, respectively, extending from the inner sidewall the housing 16. This occurs on both sides of the pipettor 10. The tabs 78, 80 are also received in detents 77, 79 (See, FIG. 6) within the cylinder block 82 to secure the cylinder block 82 to the pipettor 10. FIG. 3 shows the pipettor 10 in its normal operating position, and shows upper tab 78 engaging the lower wall of the widened groove portion 74, and lower tab 76 engaging the lower wall of widened groove portion 80. FIG. 4, on the other hand, illustrates the ejection mechanism in the fully down position at the end of the ejection stroke. The upper tab 78 does not preferably engage the upper wall of the widened groove 74, nor does the lower tab 80 engage the upper wall of widened groove 76. The distance between the upper and lower walls in widened grooves 74, 76 should be equal to or greater than to the full stroke length in the lower assembly 16. Note that the stroke of the ejector button 34 actuated by the user, as indicated by arrow 50, is longer than the stroke of the ejection mechanism for the lower assembly 16, as indicated by arrow 50A.

Figure 6:
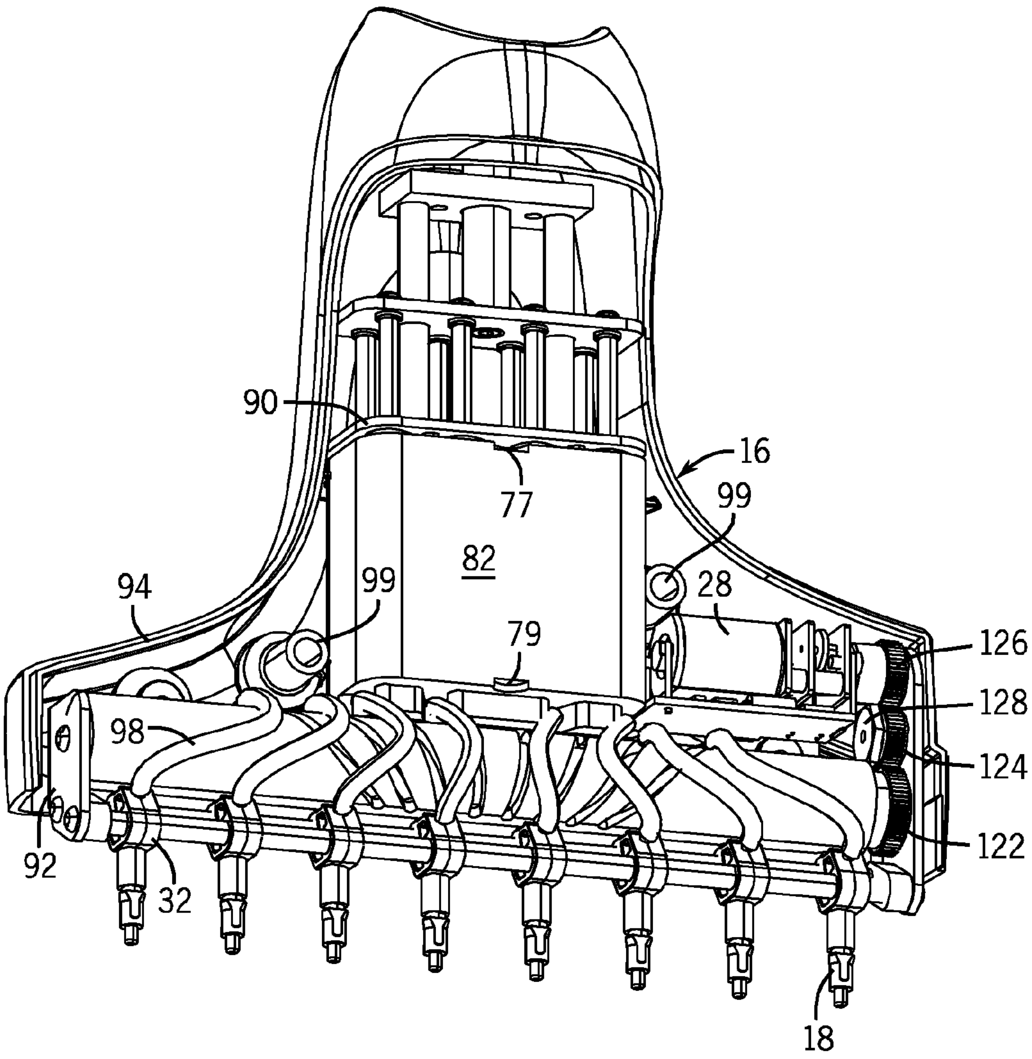
FIG. 6 is a perspective view of the lower portion of the pipettor illustrated in FIGS. 1-5 with a front part of the lower housing removed in order to show internal components.
Figure 7:
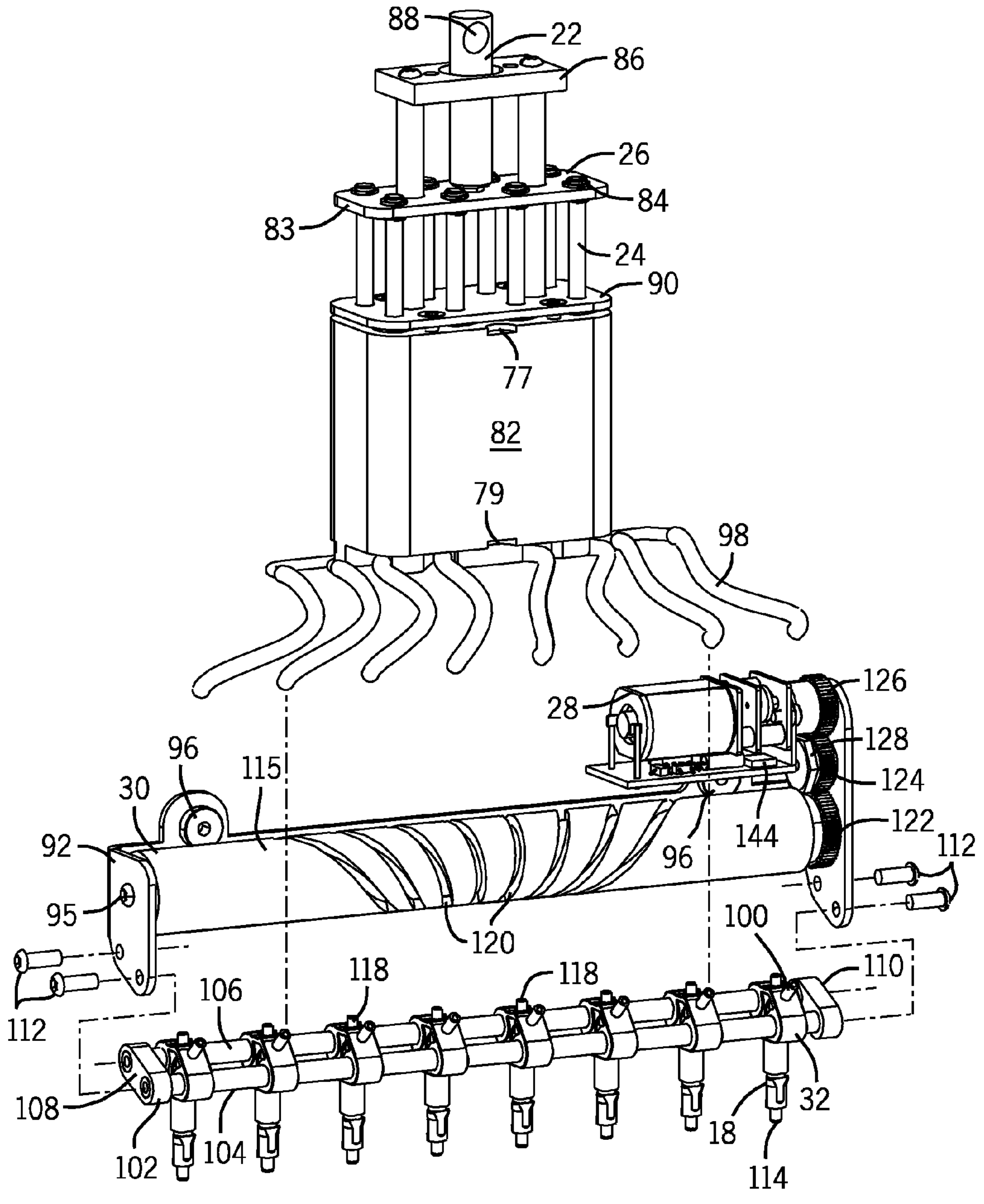
FIG. 7 is an assembly drawing of many of the internal components of the lower portion of a pipettor shown in FIG. 6.

Referring now to FIGS. 6 and 7, the main piston drive shaft 22 in the lower assembly 16 is attached at its lower end to a piston drive plate 83, preferably using a screw. A plurality of pistons 24 are attached to the drive plate 83, for example using snap rings 84. A spring support 86 extends upward from the aspiration cylinder block 82. Although not shown in the drawings, a spring is placed around the main piston drive shaft 22 between the spring support 86 and the underside of the collar portion of the forked ejection collar 52. Legs for the spring support 86 pass through the openings in the piston drive plate 83. The main piston drive shaft 22 passes through an opening in the upper plate for the spring support 86. The upper end of the main piston drive shaft 22 is connected to the output shaft driven by the stepper motor 20 in the upper handle assembly 14. The main piston drive shaft 22 may be preferably connected to the output shaft from the upper handle assembly 14 using any suitable method although it is preferred that the internal components of the lower assembly 16 be removable. FIG. 7 shows a socket 88 in the main piston drive shaft 22. Preferably, a ball is present at the distal end of the output shaft driven by the stepper motor 20 in the upper assembly 14, although this is not shown in the drawings. The ball is preferably received from the side of the socket 88 and a plunger is preferably used to secure the ball within the socket 88.

The cylinder block/piston assembly also preferably includes a seal hold down plate 90 which has a plurality of openings for the pistons 24. A seal 152 and T-sleeve 150 (FIG. 12) are located between the seal hold down plate 90 and the top surface of the aspiration cylinder 82 for each piston 24. The seal hold down plate 90 is attached to the upper surface of the cylinder block 82 with the respective seals and washers sandwiched therebetween. The cylinder block 82 is preferably machined from aluminum or acetal, although other material may be suitable. The pistons 24 and the main piston drive shaft 22 as well as the plates 84 and 90 are preferably made of stainless steel as is known in the art, and the seals are preferably made of an elastomeric material, as also known in the art, although other materials may be used as well. The embodiment shown in the Figures illustrates a stationary seal 152 arrangement, although for larger volumes, it may be desirable to use a sliding seal arrangement in which a cup seal is attached to the piston. In addition, other suitable sealing arrangements may be used in accordance with the invention, if desired.

A metal chassis 92, preferably made from sheet metal, is attached to the rear housing 94 for the lower assembly 16. In particular, the chassis 92 includes a pair of threaded inserts 96 for screwing the chassis 92 to the rear housing 94. The cylinder block 82 is fixed relative to the housing for the lower assembly 16, by housing tabs 78 and 80 interfacing with recesses 77 and 70. The rear housing 94 and the front housing for the lower assembly 16 are connected together using screws that pass through grommets 99 in the housing members. As will be described below in connection with FIGS. 13 and 14, the lower portion of the cylinder block 82 includes an integral manifold of ports for each of the multiple aspiration cylinders within the cylinder block 82. While it is preferred that the manifold be integral with the cylinder block 82, this is not necessary to carry out the invention. A plurality of flexible tubes 98 connect the ports from the aspiration cylinders to ports 100 on the repositionable tip fitting assemblies 32. The tubes 98 are preferably made of silicone or PVC (ID of 1/16"), and have varying lengths appropriate to accommodate the range of motion of the respective repositionable tip fitting assembly 32, as will be discussed below. It is important that the seal between the ends of the tubes 98 and the ports from the cylinder block 82, as well as the ports 100 on the repositionable fittings 32, be secure and air-tight.

A guide rod assembly 102 for the plurality of repositionable tip fitting assemblies 32 is attached to the chassis 92. The guide rod assembly 102 preferably has two parallel rods 104, 106 made of stainless steel. The parallel guide rods 104, 106 are attached at both ends using a rigid coupler or spacer 108, 110. The rigid spacers 108, 110 maintain the guide rods 104, 106 precisely spaced during assembly and operation of the pipettor 10. During assembly, the repositionable tip fitting assemblies 32 are slidably mounted on the two parallel rods 104, 106, and then with the rigid spacers 108, 110 in place, the guide rod assembly 102 is fastened to the lower portion of the chassis 92 using screws 112, as shown in FIG. 7. With this configuration, the repositionable fittings 32 are able to move along the rods 104, 106 such that the lower port 114 for each respective tip mounting shaft 18 has a range of motion traveling along a line parallel to the rods 104 and 106. In this manner, each of the tip mounting shafts 18 as well as pipette tips 12 mounted to the shafts 18 remain aligned within a common plane of travel, and also the lower openings in the mounted pipette tips 12 are aligned precisely along a line in order to facilitate aspiration and dispensing of liquid from multiple linearly disposed containers or wells.

The tracked roller drum 30 is also mounted to the chassis 92, and is parallel to guide rods 104 and 106. The roller drum 30, preferably made of acetal, has an outer tracked surface 115, and rotates over an inner reinforcing axle 31, FIG. 12, preferably made of steel or aluminum. Each repositionable fitting 32 includes a vertically extending cam following pin 118 that is seated within one of the respective tracks 120 on the roller drum 30, as is discussed in more detail with respect to FIG. 12.

A spur gear 122 is attached to one end of the roller drum 30. The spur gear 122 on the roller drum 30 is driven by a vertically aligned idler gear 124 and a DC motor output gear 126. The idler gear 124 is mounted to the chassis 92 using bearing post 128 which has a relatively large head in order to maintain alignment of the idler gear 124. Although not shown in the drawings, the chassis 94 includes a partial axle which serves to support the DC motor output gear 126 in the proper location. Preferably, the gears 126, 124 and 122 are vertically aligned in order to allow the lower assembly 16 to maintain a slender profile. Although not preferred, a belt drive mechanism can be used in lieu of a vertical gear train.

Referring now to FIGS. 8A-8C, the miniature DC motor 28 in the lower assembly 16 drives gears 126, 124 and 122 to rotate the roller drum 30, thereby repositioning the repositionable tip fitting assemblies 32 to adjust the center-to-center spacing between the pipette tip mounting shafts 18. In FIG. 8A, the fitting assemblies 32 are fully spread, which would preferably correspond to a center-to-center spacing of 14.14 mm for an 8-channel pipettor. FIG. 8B shows an intermediate position for the fitting assemblies 32 which would occur after the motor 28 had rotated the roller drum 30 in a clockwise direction as viewed from the side of the pipettor 10 on which the gears 126, 124 and 122 are located. FIG. 8C shows the fittings in a fully tightened position, in which the center-to-center spacing between the tip mounting shafts 18 is preferably 4.5 mm (or 9 mm depending on the particular embodiment). Note that in the preferred embodiment of the invention, all of the fitting assemblies 32 move when the roller drum 30 is rotated to tighten the spacing or to spread the spacing. However, the relative spacing between the fitting assemblies 32 changes evenly. This is accomplished by designing the tracks 120 appropriately so that linear movement of the fitting assemblies 32 is proportionate to rotation of the drum 30. It is desirable that the length of the flexible tubing 100 be minimized for each of the channels. For the two outermost channels on either end, fitting assemblies labeled 32A, 32B in FIG. 8B, the port 128A, 128B from the respective aspiration cylinder is centered along the range of travel for the fitting assembly 32A, 32B. FIGS. 8A, 8B and 8C show dashed line 130 defining the center point of the range of travel for the leftmost repositionable fitting assembly 32A. The distance represented by arrow 132 in FIG. 8A is preferably equal to the distance represented by arrow 134 in FIG. 8C.

Referring to FIG. 9, the miniature DC gear motor 28 in the lower assembly 16 is mounted to bracket 141 which is in turn mounted to the chassis 92 using screws 140. A dedicated microprocessor 142 (i.e., a daughter microprocessor) is mounted on a circuit board 138 (which is mounted to the bracket 141) and controls the operation of the motor 28 in response to instructions from the main microprocessor in the handle assembly 14. The motor 28 receives power from wires 139 which preferably extend through the circuit board 138 and are soldered to the motor 28 in order to provide additional structural stability. The wires 134 receive power from a ribbon cable (not shown) which runs into the upper handle assembly 14. The ribbon cable carries power from the battery located in the upper handle portion, and also provides control signals to the daughter board 142.

Figure 10:
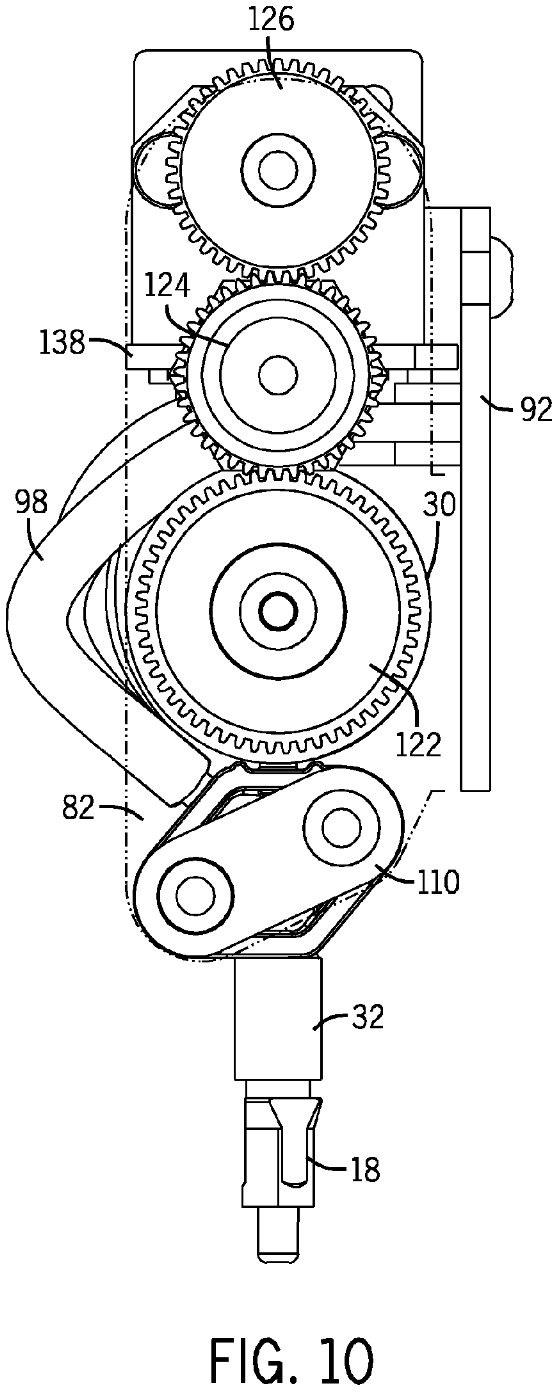
FIG. 10 is a view taken along line 10-10 in FIG. 9.
Figure 11:
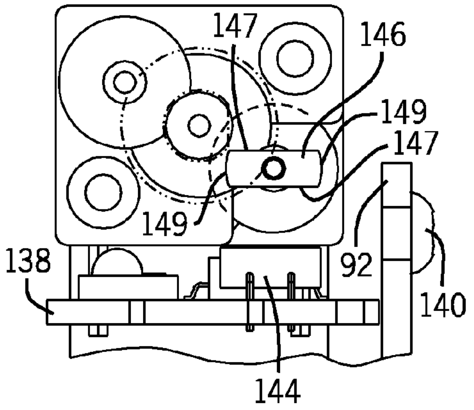
FIG. 11 is a view taken along line 11-11 in FIG. 9.

An encoder detector 144 (best seen in FIG. 11) is also mounted to the circuit board 138 and detects the rotation of flag 146 in order to provide indirect feedback as to the position of the roller drum 30. The RPM output from the miniature gear motor 28 is reduced via cluster gears 148, and the output shaft is provided to drive gear 126 that is supported in part by the chassis 92. FIG. 10 shows the preferred vertical alignment of the drive gear 126 with the idler gear 124 and the spur gear 122 at the end of the roller drum 30. Note that this configuration is especially helpful because it allows the motor 28 to be mounted above the roller drum 30 in a compact manner. FIG. 11 is a detailed view showing the preferred placement of the encoder detector 144 and the encoder flag 146 on the board 138.

Referring now to FIGS. 9 and 11, the miniature DC gear motor is preferably a 2.4-volt to 5-volt motor with an output speed of approximately 150 RPM after gear reduction through the cluster gears 148, such as the type used in video cassette recorders. The output shaft on the motor 28 itself rotates in the range of 14,000-15,000 rpm, and cluster gears 148 provide significant speed reduction. Suitable speed reduction preferably takes three to four sets of cluster gears. An encoder flag 146 is mounted on an intermediate cluster gear, as shown in FIGS. 9 and 11. In FIGS. 9 and 11, the flag 146 is mounted on the second cluster gear for rotation. At this gear reduction, the flag 146 rotates 51-53 rotations per the entire span of the roller drum 30. The encoder sensor 144 is preferably an LED emitter/receiver photo micro detector. More specifically, the preferred emitter/detector is a reflective photo micro detector, EE-SY125 from Omron, which has a 1 mm sensing distance. Preferably, the flag 146 has non-reflective longitudinal sides 147 and reflective ends 149. In some circumstances, it may not be necessary that the longitudinal sides 147 be non-reflective because those sides are outside of the range of the emitter/receiver 144. Further, the geometry of the longitudinal sides 147 and the ends 149 can be made concave or convex in order to facilitate accuracy of the detector/flag pair if necessary. The detector 144 counts two reflective ends 149 per rotation, and therefore (in the preferred embodiment) there are roughly 102-106 counts per the full span of the roller drum 30. The minimum center-to-center positioning for the pipette tips, as shown in FIG. 8C, is 4.5 mm, which correlates to 31 mm (7×4.5) for an 8-channel pipettor and 49.5 mm for a 12-channel pipettor (11×4.5). The maximum spread, as shown in FIG. 8A, is a total of 99 mm, which correlates to 14.14 mm center-to-center for an 8-channel pipettor, and 9 mm center-to-center for a 12-channel pipettor. Therefore, the resolution of the encoder 144,146 is about 0.3 mm for an 8-channel pipettor and about 0.25 mm for a 12-channel pipettor.

In another embodiment, instead of using flag 146, the photo detector 144 senses passing gear teeth directly. While the use of an encoder 144,146 is the preferred mechanism for sensing the location of the repositionable tip fittings 32, other methods can be used as well. For example, mechanical stops can be set at inner and outer positions, or electric switches can be used to detect user settable positions. Also, if desired the pipettor can include a visual scale for pipette tip positioning.

Figure 12:
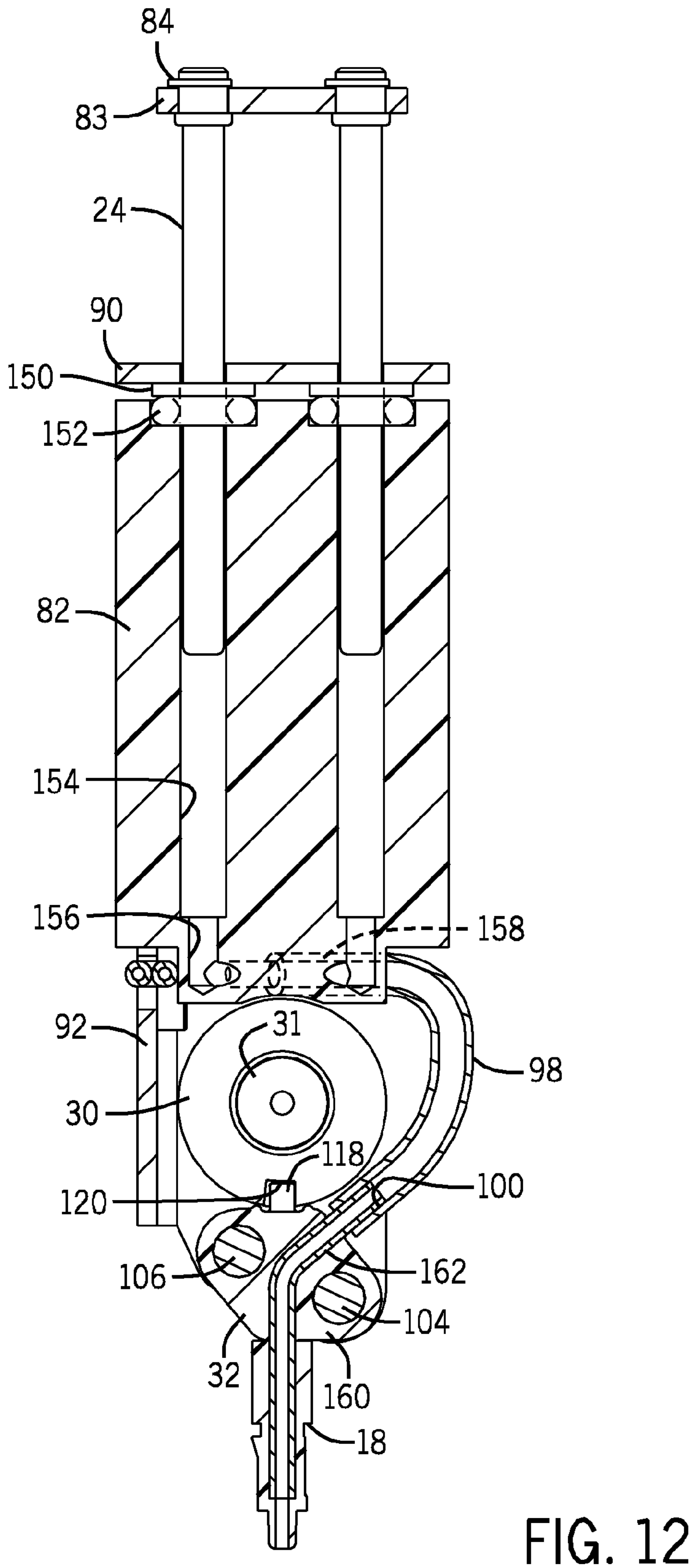
FIG. 12 is a cross-sectional view taken along line 12-12 in FIG. 8A.

FIG. 12 illustrates a cross-section along one of the air flow passageways for a channel in the lower assembly 16. For the channel shown, FIG. 12 shows a piston 24 depending from the piston drive plate 83 and extending into an aspiration cylinder 154 in the cylinder block 82. A washer 150 and seal 152 are held down by seal hold down plate 90, as previously described. Cylinder block 82, preferably machined from aluminum or acetal as previously mentioned, includes an L-shaped channel 156 at the lower end of each cylinder 154. Each channel 156 has a circular diameter adapted to receive a rigid tube 158. The rigid tube 158 shown in FIG. 12 extends forward to form a port for the flexible tube 98. One end of the flexible tube 98 is mounted over the port 158 for the cylinder 154, and the other end of the flexible tube 98 is mounted to a port 100 on the repositionable fitting 32. As mentioned, the flexible tubing 98 is preferably silicone flexible tubing or PVC having a nominal inside diameter of 1/16", although other types of tubing can be used.

The repositionable tip fitting assembly 32 preferably includes several parts, namely a main body 160, an air transport tube 162, a cam following pin 118, and a pipette tip mounting shaft 18. The repositionable tip fitting assembly 32 is preferably molded from acetal filled with a lubricant like PTFE (polytetrafluoroethylene). The openings for guide rods 104 and 106 are integrally molded into the fitting body 160 as is the cam following pin 118 extending upward from the main body 160. In addition, the transport tube 162 is insert molded within the main body 160 and passes between the openings for the guide rods 104 and 106. Since the tolerance for the openings for the guide rods 104 and 106 is critical for smooth repositioning of the tip fitting assembly 32, it may be desirable to machine the openings although this should not normally be necessary. In addition, as shown in FIG. 8C for example, the width of the body 160 for the tip fitting assemblies 32 is preferably chosen to be as wide as possible in order to provide suitable side-to-side stability, but cannot be wider than the selected minimum value for the center-to-center distance for the pipette tip mounting shafts 18, namely 4.5 mm in the preferred embodiment shown in the Figures (or preferably 9 mm in other embodiments). In a preferred embodiment showing an 8-channel pipettor, the width of the body portion 160 of the tip fitting assemblies 32 is preferably 4.5 mm. Those skilled in the art will understand that 8-channel pipettors can have other widths such as 9 mm. The opening for guide rod 104 is located forward of and lower than the opening for guide rod 106. Preferably as shown, the mounting shaft 18 is mounted to the main body 160 along a longitudinal axis which passes between the openings for the guide rods 104 and 106. The cam following pin 118 is also preferably located on this axis. The transport tube 162 is bent, preferably at a 40° angle so that the port 100 on the assembly 32 extends upward at a convenient angle to receive the flexible tube 98. More specifically, it is desirable that the port 100 be in an orientation that is at or near tangent to the roller drum surface 30, such as 40°. As shown for example in FIGS. 6 and 7, the ports 100 defined by the bent transport tube 162 preferably face in the forward direction, albeit at a 40° angle. The transport tube 162 is preferably made of solvent resistant material such as stainless steel tubing having an OD of 1/16 ". The mounting shaft 18 is preferably made of machined or molded metal or polymer (e.g. PEEK) and attached over the downward extending leg of the bent transport tube 162, preferably via press fit although it may be necessary to use adhesive in some circumstances.

The preferred configuration for the pipette mounting shaft 18 is disclosed in copending patent application Ser. No. 11/552,384, entitled "Locking Pipette Tip And Mounting Shaft", by Gregory Mathus, Terrence Kelly and Richard Cote, filed on Oct. 24, 2006, assigned to the assignee of the present application and incorporated herein by reference, and Ser. No. 11/934,381, entitled "Locking Pipette Tip And Mounting Shaft", Gregory Mathus, Terrence Kelly and Richard Cote, filed on Nov. 2, 2007, assigned to the assignee of the present application and incorporated herein by reference.

The roller drum 30 is mounted over a rigid axle 31. The axle 31 is preferably a steel or aluminum rod, or it can be made of plastic such as acetal. The axle 31 is stationary and is attached to the chassis 92 using screws 95, FIG. 7. The roller drum 30 is preferably machined, as mentioned from a rod of lubricious material such as acetal, in order to cut the grooves 120 and the center bore, as well as preferably a hex fitting for the spur gear 122. The spur gear 122 is press fit onto the machined hex fitting so that the roller drum 30 rotates in sync with the spur gear 122. It is desired that the bore through the roller drum 30 provides slight clearance around the stationary support axle 31. Preferably, each end of the bore also has slight indentions machined therein to receive press fit brass bushings (not shown) in order to extend the wearability of the roller drum 30. The grooves 120 are also machined at a depth to provide slight clearance with respect to the top surface of the cam following pins 118 on the repositionable tip fitting assemblies 32. In this manner, the lubricity of the acetal components provides smooth, relatively frictionless movement when adjusting and readjusting the position of the tip fitting assemblies 32. However, when the user is mounting pipette tips, the upward force on the mounting shafts 18 and hence the guide rods 104, 106 is reinforced by the stationary axle 31 after a small amount of upward displacement, thereby protecting the guide rods 104 and 106 from permanent distortion and providing necessary rigidity for mounting the pipette tips.

Figure 13:
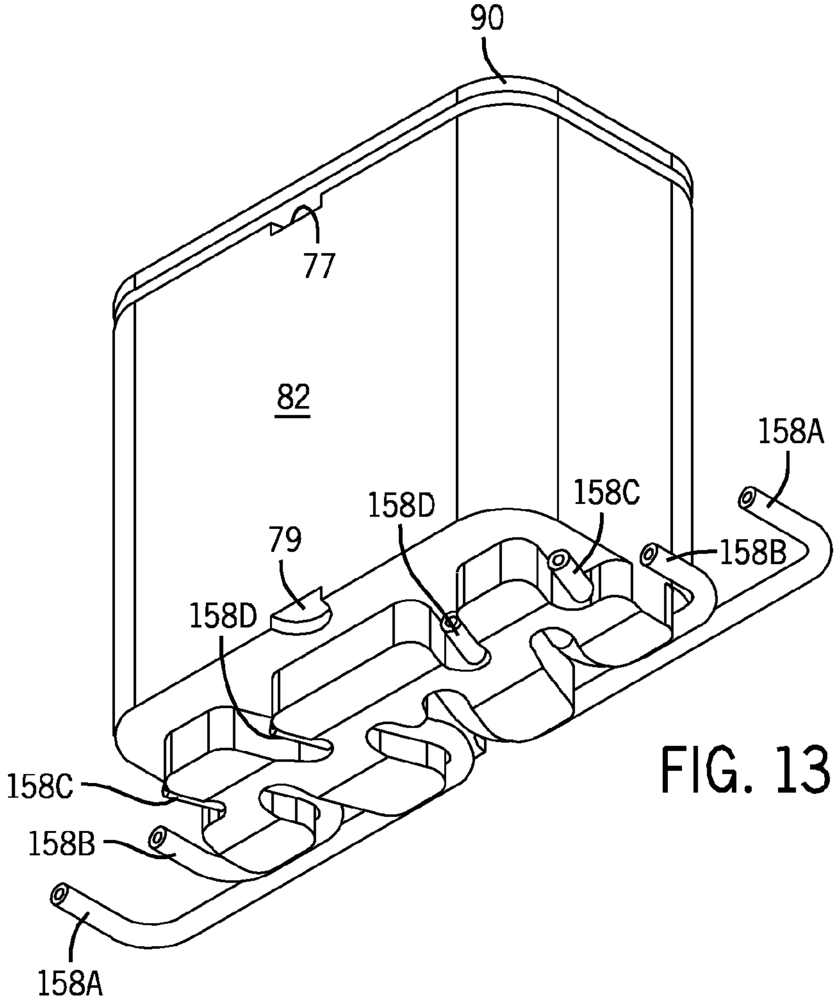
FIG. 13 is a lower perspective view of an aspiration cylinder block used in the lower portion of the pipettor shown in FIGS. 1-12.
Figure 14:
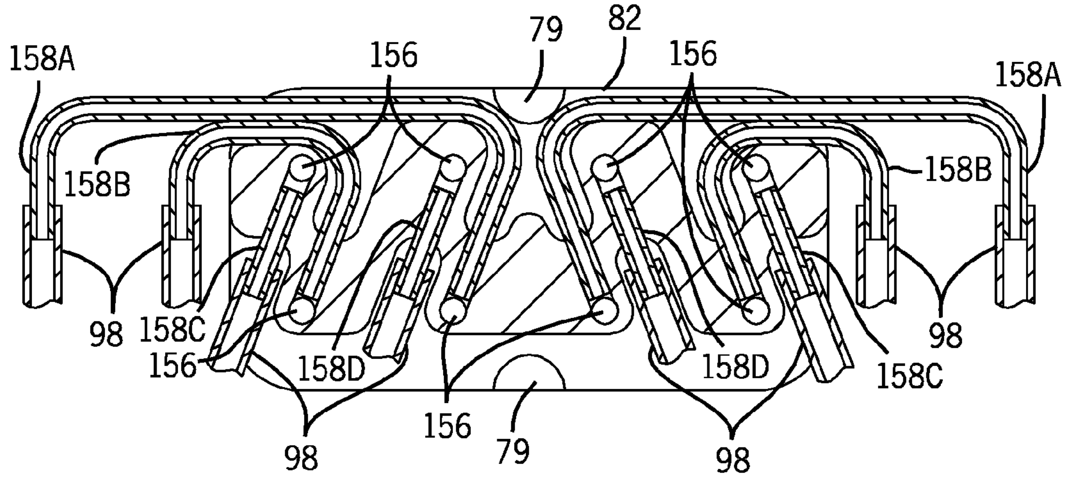
FIG. 14 is a cross-sectional view taken along the plane through which the outlet ports from the aspiration cylinders exit the cylinder block shown in FIG. 13.

Referring now to FIGS. 13 and 14, the manifolding from the cylinder block 82 to the flexible tubes 98 consist of machined outlet passageways 156 in the cylinder block 82 as well as rigid stainless steel tubing 158A, 158B, 158C, 158D. The rigid tubing 158A, 158B, 158C, 158D is configured, as mentioned above, in order to reduce the overall required length of flexible tubing 98 and to coordinate and organize the orientation of the flexible tubing 98 for all positions of the repositionable fitting assemblies 32. In this regard, it is desirable to locate the ports 158A, 158B for the outer mounting shafts and fittings 32A, 32B FIG. 8B at or near the center of the range of travel for those tip fitting assemblies 32A, 32B as described previously with respect to FIGS. 8A-8C. The rigid tubing 158A, 158B for the outer mounting shafts and fittings 32A, 32B should exit the cylinder block 82 towards the rear of the pipettor, as shown in FIGS. 13 and 14, in order to provide the desirable spread of attachment locations for the flexible tubing 98 without having any crossover between rigid tubes 158A, 158B, 158C, 158D or flexible tubes 98. The contour of the lower portion of the cylinder block 82 is machined in order to provide proper clearance for rigid tubes 158A, 158B, 158C, 158D as well as clearance for attachment of flexible tubing 98, particularly with respect to rigid tubes 158C and 158D. The outlets for the tubes 158A, 158B preferably face perpendicularly forward, whereas the outlets for the rigid tubes 158C, 158D preferably face slightly outward. All of the outlets for the rigid tubing 158A, 158B, 158C, 158D preferably lie in a horizontal plane, as shown in FIGS. 12-14. It has been found that this orientation along with the 40° or tangent orientation of the port 100 on the repositionable fitting assembly 32 provides effective and manageable attachment for each of the flexible tubes 98, without pinching and without excessive tubing 98. For example, the tubing 98 for the outer fitting assemblies 32A, 32B is long enough to comfortably reach between its outermost location, FIG. 8A, and its innermost location, FIG. 8C, without creating too much bunching at the intermediate position, FIG. 8B. On the other hand, tubes 158C, 158D must be mounted at an angle in order to extend forward without interfering with the outlet ports 156 for the tubes 158A, 158B. The tubing 98 for the inner fittings 32C, 32D is shorter, and therefore it is not necessary for the outlets for the rigid tubing 158C, 158D to point straight forward. As mentioned previously, it is desirable that the flexible tubing 98 be free to move without obstruction, however, it is also desirable that the flexible tubing 98 not extend too far in front of or beyond the drum 30. Therefore, it is desirable that the outlets for the rigid tubes 158A, 158B, 158C, 158D be suitably placed rearward of the front surface of the cylinder block 82 in order to provide room for the flexible tubing 98 to attach and bend naturally within the confines of the housing. The configuration of rigid tubes 158A, 158B, 158C, 158D shown in FIGS. 13 and 14 provides this advantage.

Referring now to FIGS. 15A-15F, the pipettor 10 preferably operates using menu driven software which is programmable by the user, as mentioned substantially in accordance with the system described in copending and incorporated U.S. patent application Ser. No. 11/856,232, entitled "Pipettor Software Interface". The menu driven software is, however, modified preferably in accordance with the description below with respect to FIGS. 15A-15F in order to accommodate a pipettor with repositionable tip fitting assemblies 32. Reference should be made to the above mentioned copending patent application as well as copending and incorporated patent application Ser. No. 11/856,231 entitled "Electronic Pipettor Assembly", for the overall operation of the pipettor and the programmable interface. Briefly, referring to FIG. 1, in the preferred embodiment, the front side of the pipettor 10 includes a touchpad control 170, a run button 172, and a user interface display 174. The touchpad control 170 and the run button 172 can be conveniently operated by the thumb of a user in order to program and operate the pipettor 10. Generally speaking, menus displayed on the user interface display 174 are navigated using the touchpad control 170, which includes the ability to translate relative rotational movement of a finger or thumb into up and down scrolling movements on the display screen 174, and also provides right and left navigation buttons 171,173, a "purge" button 175, a "go back" button 177, and a center enter or "OK" button 179, all as described in the above mentioned copending patent application Ser. No. 11/856,232 entitled "Pipettor Software Interface".

Figures 15A, 15B, 15C:
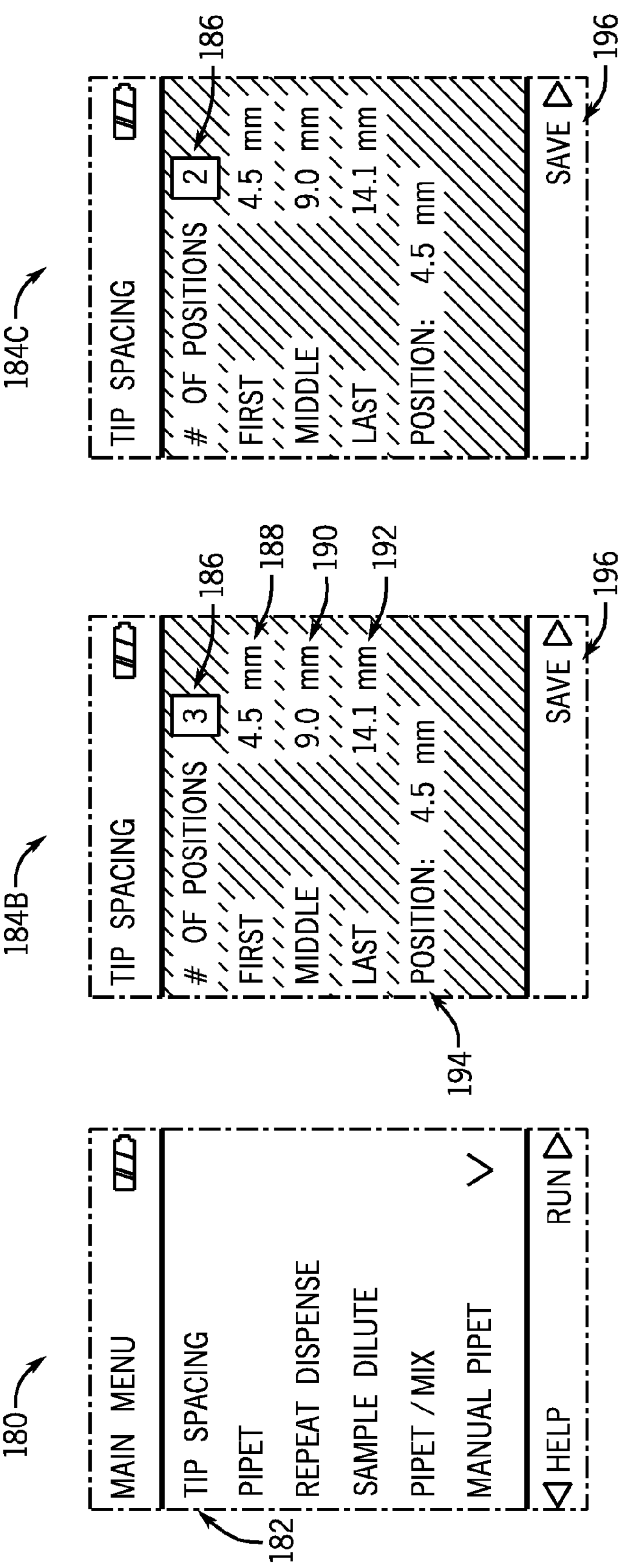
FIGS. 15A-15F illustrate user interface screens that are displayed on the pipettor shown in FIGS. 1-14 in order to program and execute the repositioning of pipette tips.
Figure 15D:
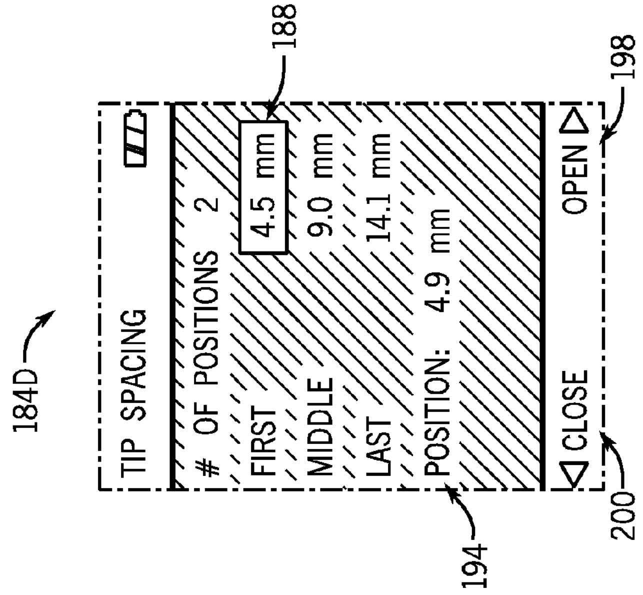
Figure 15E:
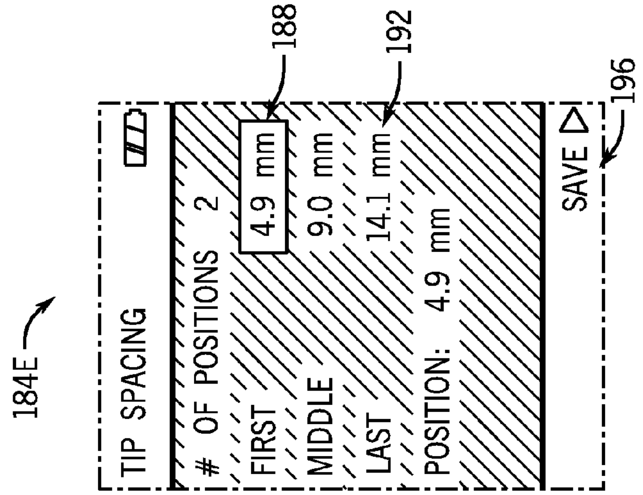

FIG. 15A illustrates the preferred main menu screen 180, which has been modified to provide an additional menu selection 182 for programming the tip spacing. When the user selects the tip spacing 182 from the main menu 180, the tip spacing programming screen 184B in FIG. 15B appears on the user interface display 174. Tip spacing screen 184B in FIG. 15B contains several prompts, the first being the number of positions, as indicated by reference numeral 186. Preferably, the software allows the user to select whether to program set center to center spacing for either two positions or three positions. Two positions, namely "first" and "last", would typically be selected in the case where the user wishes to aspirate from a series of containers having a first center-to-center spacing, for example 4.5 mm, and to dispense into a series of containers having a second center-to-center spacing such as 9 mm. Preferably, a third position, namely "middle", is also offered in situations where the user would like to aspirate, dispense, or mount or eject the tips in a position different from the first and last positions. FIG. 15B shows that the user has selected that the number of positions be three, and the screen illustrates prompts for the first, middle and last positions, as illustrated by reference numbers 188, 190 and 192. The prompt labeled "POSITION" indicated by reference numeral 194 displays the current center to center distance. Referring to FIG. 15C, the tip spacing screen 184C shows that the user has selected to program two positions as represented by the number 2 in the highlighted box adjacent the prompt 186 for the number of positions. If the user is satisfied with the programming for the distances for the first and last positions, the user can save these distances by hitting the right navigation button 171 on the touch pad control, as indicated by icon 196. Otherwise, the user can use the touchpad control to navigate the menu as shown in FIG. 15D. In FIG. 15D, the user has highlighted the first position prompt 188, and has adjusted the position to 4.9 mm, as indicated by the value adjacent the position prompt 194. The "open" icon 198 indicates that the user can increase the programmed position distance using the right navigation button 171 on the touchpad control, whereas the "close" icon 200 indicates that the user can decrease the center-to-center distance by using the left navigation button 173 on the touchpad control. The tip spacing programming menu 184E shown in FIG. 15E shows that the user has reprogrammed the distance adjacent to the first position prompt 188. As mentioned, the user can save this setup by hitting the right navigation button 171 on the touchpad control, as indicted by the save prompt 196. The last distance can be programmed in the same manner as described, and if three positions were chosen, the same is true for the middle distance as well. The tips are physically moving when the open and close buttons 198, 200 are pressed. This feature allows the operator to measure by eye the desired spacing. At the same time, the precise spacing distance will be displayed on the screen.

Figure 15F:
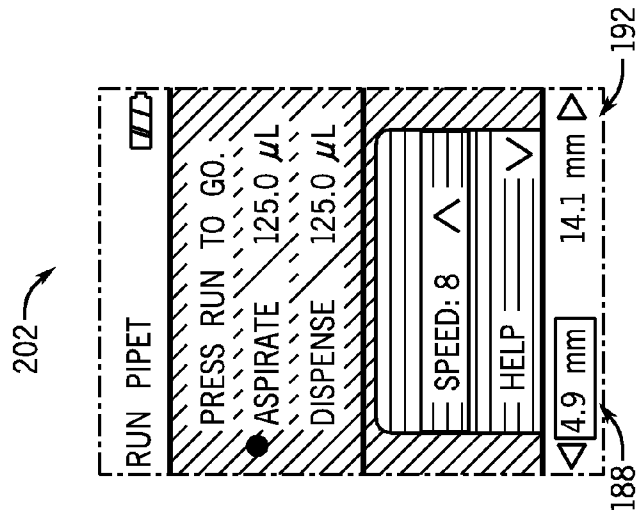

FIG. 15F shows a run menu 202 for running a pipette procedure "PIPET" as described in the above copending patent application Ser. No. 11/856,232, entitled "Pipettor Software Interface" on the pipettor 10 disclosed herein having repositionable pipette tip mounting shafts. Note that for this procedure, as shown in FIG. 15F, it is preferable to aspirate at one center-to-center distance, i.e. the first programmed distance 188, namely 4.9 mm in this example, and dispense at the last programmed distance 192, i.e. 14.1 mm as shown in this example. Before the user presses the run button 172 on the touch pad control to aspirate, the user would press the left navigation button 173 on the touch pad control to reposition the pipette tips at 4.5 mm center to center spacing. After aspiration, the user would then press the right navigation button 171 on the touch pad control to reposition the pipette tips at 14.1 mm spacing before pressing the run button 172 to dispense in the next step. In FIG. 15F, the next step in the procedure is to aspirate 125.0 μL, and the first distance of 4.9 mm distance is highlighted at the bottom of the screen. Because the operator desires to aspirate at the first position of 4.9 mm, the user will place the pipette tips in the sample wells to be aspirated. After aspiration, the operator will press the right navigation button 171 to reposition the pipette tips in the last position of 14.1 mm prior to the dispensing step.

We claim:

1. A hand-held, electronic multi-channel pipettor comprising:

an upper handle portion adapted to be held in the hand of the user;

a user interface display located on the pipettor;

a lower portion having multiple aspiration cylinders and a plurality of repositionable pipette tip fitting assemblies, each comprising a pipette tip mounting shaft;

a motor for moving the repositionable tip fitting assemblies to adjust the center line spacing between the tip mounting shafts;

one or more microprocessors that control the motor; and software that programs the one or more microprocessors to operate the motor to position and reposition the repositionable tip fitting assemblies;

wherein the software includes a tip spacing programming screen displayable on the user interface display that allows the user to select tip spacings for at least two desired settings.

2. A hand-held, electronic multi-channel pipettor as recited in claim 1 wherein the tip spacing programming screen in the software allows the user to select tip spacings in sets of only two or three positions.

3. A hand-held, electronic multi-channel pipettor as recited in claim 1 wherein the pipettor further comprises at least one navigation button as part of the user interface, and the software includes a run screen including an indication of the appropriate navigation button or buttons that the user must actuate to adjust the pipette tip spacing to at least two selected tip spacings.

4. A hand-held, electronic multi-channel pipettor as recited in claim 1 wherein the current tip spacing setting is highlighted on the user interface display.

5. A hand-held, electronic multi-channel pipettor as recited in claim 1 wherein the software further controls the information displayed by the user interface display and the operation of the pipettor to aspirate and dispense.

6. A hand-held, electronic multi-channel pipettor as recited in claim 5 further comprising a touchpad control and a run button located on the upper handle portion.

7. A hand-held electronic multi-channel pipettor as recited in claim 6 wherein the touchpad control includes a circular touchpad in which rotational movements of a thumb or finger translate in cursor movements on the display.

8. A hand-held, electronic multi-channel pipettor as recited in claim 1 wherein the motor for moving the repositionable pipette tip assemblies to adjust the centerline spacing between the mounting shafts is defined as a tip spacing motor and the pipettor further comprises:

a pipetting motor for controlling the movement of pistons within the multiple aspiration cylinders;

and wherein software also programs the one or more microprocessors to move the pistons to aspirate and dispense.

9. A hand-held, electronic multi-channel pipettor as recited in claim 8 wherein the pipetting motor resides in the handle portion and the tip spacing motor resides in the lower portion.

10. A hand-held electronic multi-channel pipettor as recited in claim 8 further comprising a roller drum that rotates around a drum axis to move the repositionable pipette tip fitting assemblies and adjust the centerline spacing between the mounting shafts; and an encoder that provides signal regarding the position of the repositionable pipette tip fitting assemblies to the one or more microprocessors within the pipettor.

11. A hand-held, electronic multi-channel pipettor comprising:

an upper handle portion adapted to be held in the hand of the user;

a user interface display located on the pipettor;

a lower portion having multiple aspiration cylinders and a plurality of repositionable pipette tip fitting assemblies, each comprising a pipette tip mounting shaft;

a motor for moving the repositionable tip fitting assemblies to adjust the center line spacing between the tip mounting shafts;

one or more microprocessors that control the motor; and software that programs the one or more microprocessors to operate the motor to position and reposition the repositionable tip fitting assemblies;

wherein the pipettor further comprises at least one navigation button as part of the user interface, and the software includes a run screen displayable on the user interface display including an indication of the appropriate navigation button or buttons that the user must actuate to adjust the pipette tip spacing to at least two selected tip spacings.

12. A hand-held, electronic multi-channel pipettor as recited in claim 11 wherein the current tip spacing setting is highlighted on the user interface display.

* * * * *